Nov. 28, 1967   B. E. PITCHES   3,355,706
APPARATUS FOR INDICATING THE DEPARTURE OF
A VARIABLE QUANTITY FROM A DATUM VALUE
Filed Oct. 28, 1964
2 Sheets-Sheet 1

Inventor
B. E. PITCHES
By
Cameron, Kerkam & Sutton
Attorneys

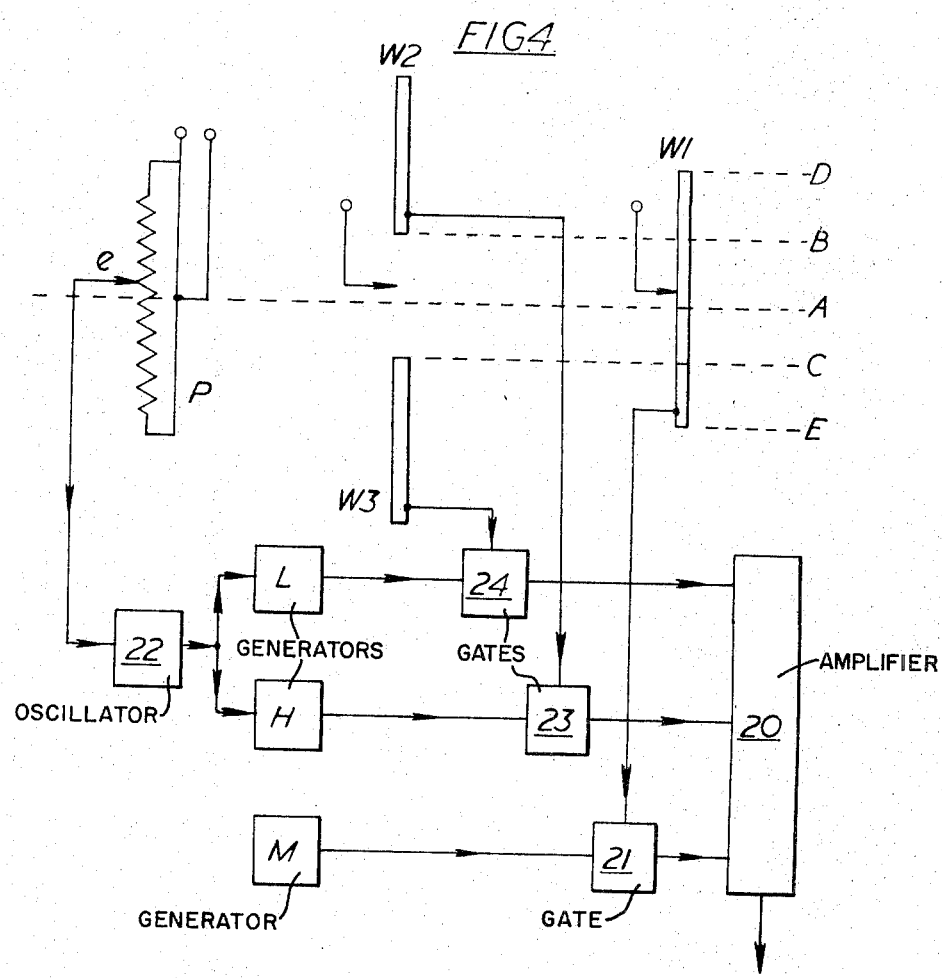

United States Patent Office

3,355,706
Patented Nov. 28, 1967

3,355,706
APPARATUS FOR INDICATING THE DEPARTURE OF A VARIABLE QUANTITY FROM A DATUM VALUE
Brian Edward Pitches, Colinton, Edinburgh, Scotland, assignor to Ferranti Limited, Hollinwood, Lancashire, England, a company of Great Britain and Northern Ireland
Filed Oct. 28, 1964, Ser. No. 407,184
Claims priority, application Great Britain, Nov. 2, 1963, 43,341/63
5 Claims. (Cl. 340—27)

ABSTRACT OF THE DISCLOSURE

An indicator having three tones of different frequency to provide an immediate indication of whether a variable quantity being measured is within a given range of values, and if outside that range, the sense and magnitude of deviation from the given range.

---

Figure 1:
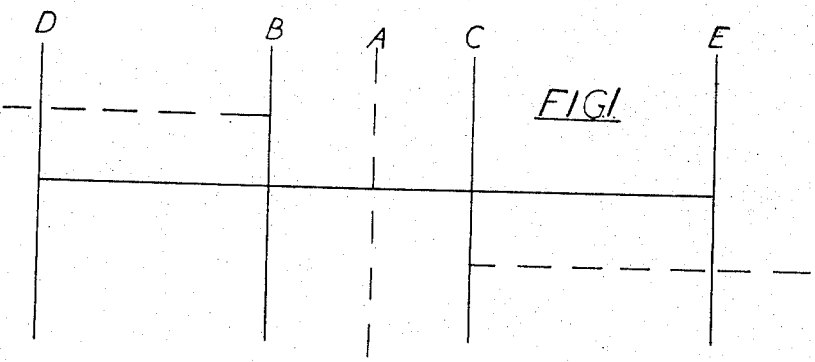

This invention relates to apparatus for indicating the departure of a variable quantity from a datum value to an extent in excess of either of permissible limits above and below said datum value.

The invention may be applied to aircraft navigation, for example to indicate to the pilot of an aircraft during landing or take-off whether or not the angle of attack of the aircraft (the quantity measured) is within a given range of values, and if the value is outside that range to indicate the sense and magnitude of the deviation from the given range. The angle of attack of an aircraft is the angle between some suitable airframe datum, say the fore-and-aft line of the aircraft, and the direction of the air flow relative to that datum, and it therefore gives an indication of the degree of lift.

The invention is not confined to uses such as that described above, but has wide applications wherever indications of this kind are required.

In the application of the invention to aircraft navigation it is most convenient to present the information in aural form since the pilot is already wearing a pair of earphones to which audible signals may be applied, and his visual attention is probably already fully occupied. However it is necessary to ensure that, when the measured quantity is within safe limits, the pilot's attention is not distracted from other more important considerations. Thus the form of the audible indications is of great importance.

It is well known that if a person is subjected to a continuous low-powered aural stimulus he soon ceases to take note of it, and it is therefore reasonable to provide some such signal when the situation in question is satisfactory. In such a case deviation of sufficient extent as to require corrective action to be taken may be indicated by modifying or supplementing the existing signal to draw attention to the change.

According to the present invention there is provided apparatus for indicating a departure of a variable quantity from a datum value to an extent in excess of either of permissible limits respectively above and below said datum value, which apparatus provides a steady audible tone when said variable quantity lies within said permissible limits, and an interrupted tone indicative of such a departure in excess of either of said limits and further indicative by the rate of such interruption of the extent of such departure.

According to the invention there is also provided apparatus for indicating a departure of a variable quantity from a datum value of an extent in excess of either of permissible limits respectively above and below said datum value, which apparatus includes means for deriving an error signal indicative by its sense and magnitude of said departure, a tone generator operable to deliver a steady audible tone, means operable when said error signal exceeds one or other of two predetermined values corresponding to said permissible limits to deliver a first or a second audible error tone according to the sense of said error signal and interrupted at a rate proportional to its magnitude, and means for removing said steady audible tone when the magnitude of said error signal in the one or the other sense exceeds one or other of preset values as the case may be, each preset value being equal to or greater than the said predetermined value of that sense.

Figure 2:
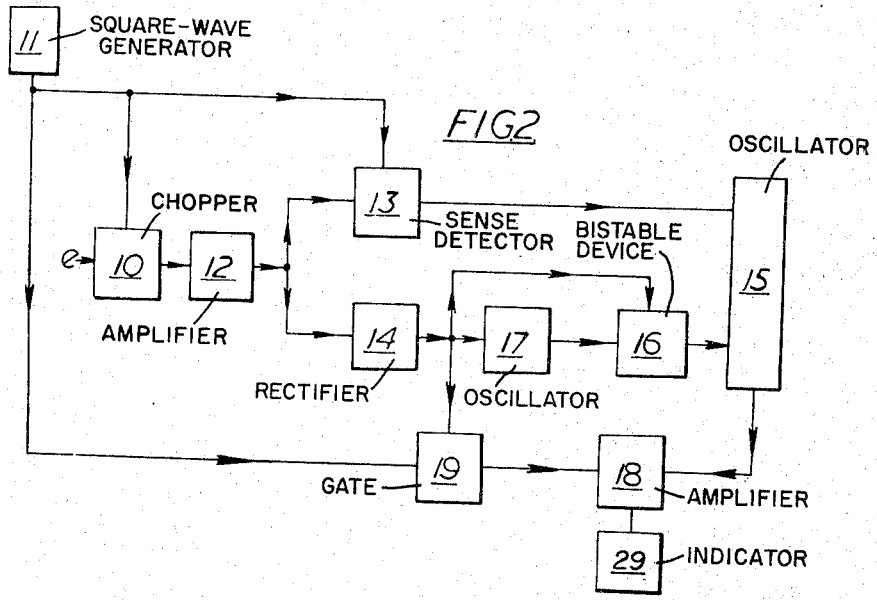
Figure 3:
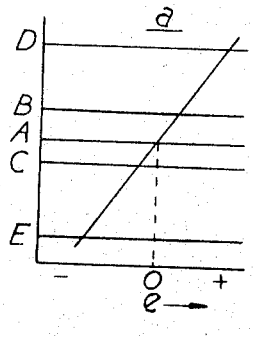
Figure 3:
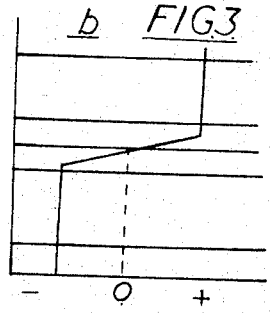
Figure 3:
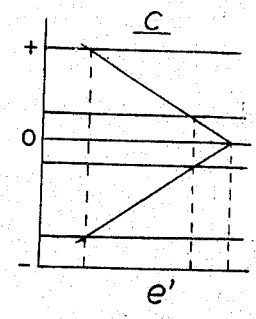

An embodiment of the invention will now be described by way of example with reference to the accompanying drawings in which:

FIGURE 1 illustrates the form of the audible signal as the deviation of the measured quantity departs from a datum value in either sense, FIGURE 2 shows, in schematic form, electronic apparatus operable to deliver audible signals of the type shown in FIGURE 1, FIGURE 3 shows the change in voltage at certain parts of FIGURE 2 as the measured quantity varies from the datum, and FIGURE 4 illustrates how the signals of FIGURE 1 may be obtained by mechanical means.

Referring now to FIGURE 1, this shows a range of values of a quantity arranged about a datum value A. It is assumed that no action need be taken to correct the value if this lies in a range from B to C, extending on either side of the datum A. In such a case a steady audible signal of "medium" frequency is delivered. If the quantity departs further from the datum a second audible signal of different frequency is also delivered, this second signal being made intermittent to draw attention to its presence and to the necessity to correct for the departure. Thus, if the quantity lies within the range BD on FIGURE 1 a "high" frequency intermittent signal will be heard along with the continuous "medium" frequency signal. Similarly if the quantity lies within the range CE a "low" frequency intermittent signal will be heard along with the continuous signal. The rate of interruption of the "high" or "low" frequency signal is made to increase as the departure of the quantity from the datum increases. Beyond the limits D or E the continuous "medium" frequency signal is discontinued, and the rate of interruption of the remaining signal continues to increase to call attention to the urgent necessity to correct the departure. It will be realised that the terms "high," "medium" and "low" as used with respect to the frequency of the audible signal are purely relative terms, and the frequency only helps to indicate the sense of the departure from the datum.

FIGURE 2 shows one form of electronic apparatus which may be used to provide the audible indications described above. It is necessary to produce an electrical error signal, most conveniently in the form of a voltage. This may be derived directly if an electrical system is to be controlled, or may be derived from mechanical movement by means of a potentiometer tapped to earth at a point indicating the required datum value. The error signal produced by movement of the slider of the potentiometer will thus indicate the departure from the datum in both sense (i.e. polarity) and magnitude. In FIGURE 2 the error signal input, a direct voltage, is indicated by the symbol $e$, and the variation of error signal voltage with deviation from the datum is shown in FIGURE 3a.

In order to control the audible signals as desired it is necessary to produce separate electrical signals indicative of the sense and of the magnitude of the error signal $e$. The error signal is first amplified but since it is a direct current signal it has to be converted into a varying signal which can be amplified. This is done by means of a "chopper" 10 which interrupts the direct current error signal in accordance with a square-wave control signal from a square-wave generator 11. The output from the chopper is thus a square-wave signal varying in voltage between zero and the error voltage at a particular instant. This signal is then amplified by an amplifier 12, the output of which is applied to two units 13 and 14. Unit 13 is a "sense detector" and delivers an output signal of one or the opposite sense depending upon the sense of the error signal. This operates by comparing the output of the amplifier 12 with the square-wave signal from 11. The variation in the output of the sense detector 13 with changes in the error signal is shown in FIGURE 3b.

Unit 14 is a full-wave rectifier which converts the output of the amplifier back into a direct voltage, the magnitude of which varies in accordance with the magnitude of the error signal $e$. The output $e'$ from 14 is shown in FIGURE 3c, and is of maximum value when the error deviation is zero.

The output from the sense detector 13 is used to control the frequency of oscillation of an audio-frequency oscillator 15. This is capable of producing either a high or a low frequency audio signal depending upon the polarity of the signal applied from the sense detector. The actual operation of the oscillator is controlled by the magnitude of the output from the rectifier 14. As stated above the high or low frequency signal is applied intermittently once the error signal exceeds a certain predetermined magnitude. In the embodiment described the operation of the oscillator 15 is controlled by a bistable device 16 which is biased into one of its stable states by the output from the rectifier 14 when this output is of sufficient magnitude. In this condition the oscillator 15, or its output, is switched off. A variable frequency oscillator 17, the frequency of oscillation of which is controlled by the output from rectifier 14, is provided as a source of trigger pulses for the bistable device 16. The output from the oscillator 15 is applied to an output amplifier 18 and hence to a suitable transducer such as a pair of earphones or visual indicator 29 illustrated in block form. The continuous medium frequency signal is derived directly from the output of the square-wave generator 11, and applied to the output amplifier 18 through a gate 19. This gate is controlled by the output from the rectifier 14.

Consider now the operation of the apparatus described above. Whilst the error signal remains at zero, there is no output from the amplifier 12 and the bistable device 16 is biased into the condition which prevents the operation of the oscillator 15. However the output from the square-wave oscillator 11 is applied through the gate 19 to the output amplifier 18 and hence to the output transducer.

Any error signal which occurs and remains within the limits B and C (see FIGURES 1 and 3) will not change the audible signal output, though the oscillator 15 will be set to generate either the high or low frequency signal by the output from the sense detector 13. The variable-frequency oscillator 17 will be operating at a frequency determined by the magnitude of the error signal, but the trigger pulses applied to the bistable device 16 will not be able to overcome the bias applied from 14.

If now the error voltage rises in one sense to a value in the range BD of FIGURES 1 and 3, the bias voltage applied to the bistable device 16 will be reduced sufficiently to allow the device to operate under the control of the variable-frequency oscillator 17. The oscillator 15 will be producing the high frequency signal under the control of the bistable device 16, and thus an intermittent high frequency tone will be applied to the output amplifier 18 along with the continuous medium frequency tone applied via the gate 19. The interruption rate of the high frequency tone will increase as the magnitude of the error voltage increases.

Similarly if the error voltage rises in the opposite sense to a value in the range CE of FIGURES 1 and 3, then an intermittent low frequency tone will be applied to the output amplifier 18 along with the medium frequency tone. Again the interruption rate of the low frequency tone will increase as the magnitude of the error voltage increases.

When the magnitude of the error voltage increases beyond the value D in one sense or the value E in the opposite sense, the output from 14 closes the gate 19 and cuts off the medium frequency tone, leaving only the high or low frequency tone as the case may be. Further increase in the magnitude of the error voltage further increases the interruption rate of the applied audio tone. Provisions may be made to render the applied tone more strident as the error voltage increases, for example by the deliberate overloading of the output amplifier 18.

FIGURE 4 shows mechanical means for producing the same signal pattern as described above. Although superficially a simpler arrangement it does of course suffer from all the usual disadvantages of mechanical apparatus.

Referring now to FIGURE 4 the deviation of the measured quantity is presented as the angular deviation of a rotatable shaft from a datum position. The shaft carries three commutator segments W1, W2 and W3, shown in the figure as straight sections. These are located so as to cover angular displacements of the required extent as indicated by the letters at the right-hand side of the figure. It is still necessary to use electronic tone generators and control means. Three tone generators are provided these being denoted H, L and M, for the high, low and medium frequency tones respectively. The medium frequency tone generator operates continuously though the application of its output to the output amplifier 20 is controlled by a gate 21 which is in turn controlled by the commutator segment W1. The remaining two tone generators H and L are controlled by the magnitude of an error voltage derived from the shaft displacement by a potentiometer P. This is arranged to produce a voltage of the same sense whatever the direction of rotation of the shaft. The error voltage controls the operation of a variable-frequency oscillator and a bistable device (shown together at 22) as before. The application of the output of H to the output amplifier 20 is controlled by a gate 23 in accordance with the movement of commutator segment W2, whilst the application of the output of L is controlled by a further gate 24 in accordance with the movement of commutator segment W3. In the figure the "brushes" of the commutator segments and potentiometer are shown as being displaced, though in practice it will normally be the commutator segments themselves which move.

Consider first the shaft in the datum position. Gate 21 is operated by commutator segment W1 since a brush is in contact with this segment. Thus the medium frequency tone is applied to the output amplifier 20. Neither of gates 23 or 24 is operated since the brush which co-operates with segments W2 and W3 is not in contact with either segment. The only output signal is therefore the medium frequency tone.

If the shaft moves to any position between B and C the situation remains as above. The variable-frequency oscillator will be operating and interrupting the generation or output of the high or low frequency tones, but these will not be applied to the amplifier 20 since gates 23 and 24 are still inoperative.

When the shaft displacement exceeds the limit B, commutator segment W2 makes contact with a brush and operates gate 23. This allows the interrupted high frequency tone to be applied to the output amplifier 20. As before the interruption rate increases as the shaft displacement increases. The medium frequency tone is still present.

Similarly if the shaft displacement exceeds the limit C commutator segment W3 allows gate 24 to operate and connects the interrupted low frequency tone to the output amplifier, along with the continuous medium frequency tone.

If the shaft displacement exceeds limit D in one sense or limit E in the opposite sense, then commutator segment W1 ceases to make contact with its brush, and gate 21 ceases to function. This removes the medium frequency tone from the output amplifier leaving only the interrupted high or low frequency tone. As before, the interruption rate of the applied tone continues to increase as the displacement from the datum increases and, again as before, the tone may be made more strident.

Although the embodiment described above is concerned with providing a three-tone warning system, the invention is not so limited. For example one or other of the error tones could be a different form of the datum tone, i.e., of the same frequency. If, for instance, a deviation from the datum in one sense would have to be corrected more urgently than a similar deviation in the opposite sense, the system could be arranged to give warning by adding a second, interrupted tone as above when the deviation in the one sense occurred. However, deviation in the other sense could be indicated simply by modification, for example, interruption, of the previously continuous datum tone. In such a case only two tone sources would be necessary. A system of this type could be produced by either electronic or mechanical means.

With any embodiment of the invention it is possible to add visual indications to the aural signals already provided. For example, three lamps could be used to represent, either singly or in pairs, the five conditions described in the first embodiment namely permissible error, slightly excessive error in either sense, and greatly excessive error in either sense.

What I claim is:

1. Apparatus for indicating a departure of a variable quantity from a datum value to an extent in excess of either of permissible limits respectively above and below said datum value, comprising means for deriving an electrical error signal indicative by its sense and magnitude of said departure, a sense detector connected to receive said signal and being operable to determine the sense of said error signal, a first audio-frequency oscillator operable to deliver a steady audible tone, a second audio-frequency oscillator operable to deliver a first or a second error tone in dependence upon the output of said sense detector, said steady audible tone and said first and second error tones all being of different frequency, a bistable circuit operable when the magnitude of said error signal exceeds one or other of two predetermined values corresponding to said permissible limits to cause said second audio-frequency oscillator to deliver said first or said second error tone, and a variable-frequency oscillator the frequency of which is dependent upon the magnitude of said error signal, said variable-frequency oscillator having its output operably connected to trigger said bistable circuit such that the delivery of said first or said second error tone is interrupted at a rate proportional to the magnitude of said error signal.

2. Apparatus as claimed in claim 1 in which said steady audible tone is removed when the magnitude of said error signal in the one or the other sense exceeds one or the other of two preset values as the case may be, each preset value being equal to or greater than the predetermined value appropriate to that sense.

3. Apparatus as claimed in claim 2 in which the means for removing said steady audible tone comprises a gate operated by the magnitude of said error signal.

4. The apparatus as claimed in claim 1 in which said first and second error tones are made more strident as the rate of interruption thereof increases.

5. Apparatus as claimed in claim 1 in which the sense and magnitude of the departure of said variable quantity from said datum value are also indicated by visual means.

References Cited

UNITED STATES PATENTS

| | | | |
|---|---|---|---|
| 2,395,368 | 2/1946 | Bull | 340—27 |
| 3,089,119 | 5/1963 | Staples | 340—27 |

NEIL C. READ, *Primary Examiner.*

A. WARING, *Assistant Examiner.*